(12) United States Patent
McClung et al.

(10) Patent No.: US 12,486,790 B2
(45) Date of Patent: Dec. 2, 2025

(54) INTERMEDIATE PRESSURE SUPERCRITICAL $CO_2$ POWER CYCLE

(71) Applicant: SOUTHWEST RESEARCH INSTITUTE, San Antonio, TX (US)

(72) Inventors: Aaron M. McClung, San Antonio, TX (US); Klaus Brun, Export, PA (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 18/447,748

(22) Filed: Aug. 10, 2023

(65) Prior Publication Data

US 2025/0052176 A1 Feb. 13, 2025

(51) Int. Cl.
*F01K 25/10* (2006.01)
(52) U.S. Cl.
CPC .................. *F01K 25/103* (2013.01)
(58) Field of Classification Search
CPC ..................................... F01K 25/103
See application file for complete search history.

(56) References Cited

U.S. PATENT DOCUMENTS

| | | | | |
|---|---|---|---|---|
| 10,309,262 | B2* | 6/2019 | Bak | F02C 1/04 |
| 2013/0033044 | A1* | 2/2013 | Wright | F22B 3/08 |
| | | | | 60/773 |
| 2021/0381399 | A1* | 12/2021 | Xu | F01K 19/04 |
| 2022/0178278 | A1* | 6/2022 | Huntington | F01K 25/103 |

FOREIGN PATENT DOCUMENTS

KR 101683714 B1 * 12/2016

* cited by examiner

*Primary Examiner* — Jonathan R Matthias
(74) *Attorney, Agent, or Firm* — Grossman, Tucker, Perreault & Pfleger, PLLC (57) ABSTRACT

The systems and methods described herein reduce relatively high pressure supercritical $CO_2$ to a relatively low-pressure supercritical $CO_2$ using a first $CO_2$ expansion system positioned upstream of the thermal input system. The relatively low-pressure supercritical $CO_2$ passes through the thermal input system and into a second $CO_2$ expansion system. The first supercritical $CO_2$ expansion system provides a first power output and/or the second $CO_2$ expansion system provides a second power output. A $CO_2$ compressor system converts the gaseous $CO_2$ exiting the second $CO_2$ expansion system to the relatively high-pressure supercritical $CO_2$, at least a portion of which is returned to the first $CO_2$ expansion system.

10 Claims, 9 Drawing Sheets

INTERMEDIATE PRESSURE SUPERCRITICAL $CO_2$ POWER CYCLE

FIELD

The present disclosure relates to power generation cycles using supercritical carbon dioxide ($CO_2$).

BACKGROUND

Supercritical carbon dioxide is an emerging technology for improved power cycle efficiency in the United States and around the world. The physical properties of carbon dioxide (critical temperature of 548° Rankine (° R) and critical pressure of 1071 psia) and the dynamics of the energy generation cycle result in a combination of high operating temperatures and high operating pressures in the thermal input equipment (e.g., combustors) used to heat the supercritical carbon dioxide. The combination of operating temperatures (e.g., temperatures in excess of 1,000° F.) and high operating pressures (e.g., in excess of 3,000 psia) requires the use of exotic and/or high cost materials of construction capable of withstanding such conditions.

Supercritical carbon dioxide power cycles are currently being developed and demonstrated for next generation utility scale nuclear and fossil fuel power generation, modular nuclear power generation, solar-thermal power generation, shipboard propulsion, geothermal power generation, and waste heat recovery applications. Cycle and component development is often driven by interest in compact, high efficiency, cycles that use minimal or, ideally, no makeup water and which are compatible with dry cooling to replace traditional steam Rankine cycles and combined cycles for utility-scale power generation and organic Rankine cycles for waste heat recovery. Closed Brayton cycles achieve high efficiencies by leveraging recuperation in the closed Brayton cycle to minimize thermal losses and through reduced compression work by leveraging the unique characteristics of supercritical carbon dioxide. Such characteristics include high fluid density. Low viscosity, and high heat capacity at pressures greater than the critical pressure of carbon dioxide and temperatures greater than the critical temperature of carbon dioxide.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The systems and methods disclosed herein provide for systems and methods of generating power using a heat source, such as a combustor, operated at an intermediate pressure to heat supercritical $CO_2$. A first $CO_2$ turboexpander, receives supercritical $CO_2$ at a relatively high pressure (e.g., 4,000 psia) and expands the supercritical $CO_2$ to an intermediate pressure (e.g., 1,100 psia) to generate a first power output. The intermediate pressure supercritical $CO_2$ passes through a heat source and is introduced to a second $CO_2$ expansion system where the intermediate supercritical $CO_2$ expands to gaseous $CO_2$ at a relatively low pressure (e.g., 400 psia) to generate a second power output. The gaseous $CO_2$ is then cooled and compressed to provide the supercritical $CO_2$, at least a portion of which is returned to the first $CO_2$ expansion system.

Such a system beneficially permits the operation of the heat source (e.g., a direct- or indirect-fired combustor) at a lower pressure than systems in which relatively high pressure supercritical $CO_2$ is passed through the heat source. For example, in a direct-fired oxy-combustion cycle, operating the heat source/combustor at an intermediate pressure advantageously simplifies the feed of solid fuels such as coal or biomass to the heat source/combustor. For example, at pressures below about 1,300 psia (90 bar), posimetric pumps may be used to feed dry fuel into the heat source/combustor, minimizing the impact of solids requiring feed as a slurry on system performance. For indirect-fired cycles, operating the primary heat exchanger at intermediate expansion pressures simplifies heat exchanger design, opening the design space up to lower grade or more readily available materials of construction than those required in higher pressure systems. For trans-critical cycles, selection of an intermediate expansion pressure just above the critical pressure of $CO_2$ simplifies the expansion system design required to accommodate a high pressure ratio with phase change into a lower pressure ratio, single phase components, a supercritical $CO_2$ expansion system, and a vapor phase $CO_2$ expansion system.

The gaseous $CO_2$ from the second $CO_2$ expansion system is compressed and condensed to provide liquefied $CO_2$. The pressure of the liquefied $CO_2$ is increased above the critical pressure of $CO_2$. The temperature of the liquefied $CO_2$ is then increased above the critical temperature of $CO_2$. In embodiments, cycle efficiency may be enhanced by heating the liquefied $CO_2$ using one or more recuperators to provide supercritical $CO_2$ at an elevated temperature and pressure. At least a portion of the supercritical $CO_2$ may then be returned to the first $CO_2$ expansion system.

In some embodiments, the gaseous $CO_2$ from the second $CO_2$ expansion system passes through a recuperator where the residual heat in the gaseous $CO_2$ is used to increase the temperature of the liquefied $CO_2$ returned to the first $CO_2$ turboexpander. A compressor receives the gaseous $CO_2$ from the recuperator and discharges a compressed gaseous $CO_2$ to a second recuperator where the residual heat in the compressed gaseous $CO_2$ is used to increase the temperature of the liquefied $CO_2$ returned to the first $CO_2$ expansion system. A condenser receives the compressed gaseous $CO_2$ from the second recuperator and discharges a liquid $CO_2$ to a fluid mover. The fluid mover increases the pressure of the liquid $CO_2$ to above the critical pressure of $CO_2$. The one or more recuperators increase the temperature of the liquid $CO_2$ above the critical temperature of $CO_2$, thereby providing supercritical $CO_2$ to the first $CO_2$ turboexpander.

A $CO_2$ power generation system is provided. The $CO_2$ power generation system may include: a first $CO_2$ expansion system having an inlet and an outlet, the first $CO_2$ expansion system to: receive, via the first $CO_2$ expansion system inlet, $CO_2$ at a first temperature and a first pressure; and expand at least a portion of the $CO_2$ to provide a first power output; and discharge, via the first $CO_2$ expansion system outlet, at least a portion of the $CO_2$ at a second temperature and an intermediate second pressure, the second temperature lower than the first temperature and the second pressure lower than the first pressure. The $CO_2$ power generation system may also include: a heater having an inlet and an outlet, wherein the heater inlet fluidly couples to the first $CO_2$ expansion system outlet, the combustor to: receive, via the heater inlet, at least a portion of the $CO_2$ at the second temperature and the second pressure; and discharge, via the heater outlet, at least a portion of the $CO_2$ at a third temperature and a third pressure, the third temperature greater than the second temperature. The $CO_2$ power generation system may also include: a second $CO_2$ expansion system having an inlet and an outlet, wherein the second $CO_2$ expansion system inlet fluidly couples to the combustor outlet, the second $CO_2$ expansion system to: receive, via the second $CO_2$ expansion system inlet, at least a portion of the $CO_2$ at the third temperature and the third pressure; expand the $CO_2$ to provide a second power output; and discharge, via the second $CO_2$ expansion system discharge, at least a portion of the $CO_2$ at a fourth temperature and a fourth pressure, the fourth temperature lower than the third temperature and the fourth pressure lower than the third pressure.

A $CO_2$ power generation method is provided. The $CO_2$ power generation method may include: generating, via a first $CO_2$ expansion system, a first power output by expanding supercritical $CO_2$ at a first temperature and a first pressure to provide an intermediate pressure supercritical $CO_2$ at a second temperature and a second pressure; the second temperature lower than the first temperature; and the second pressure lower than the first pressure. The $CO_2$ power generation method may also include: heating, by a heater, the intermediate pressure supercritical $CO_2$ from the second temperature and the second pressure to provide supercritical $CO_2$ a third temperature and a third pressure; the third temperature greater than the second temperature. The $CO_2$ power generation method may also include: generating, via a second $CO_2$ expansion system, a second power output by expanding the gaseous $CO_2$ at the third temperature and the third pressure to provide gaseous $CO_2$ at a fourth temperature and a fourth pressure; the fourth temperature lower than the third temperature; and the fourth pressure lower than the third pressure.

Although the following disclosure uses carbon dioxide as an illustrative supercritical material for use in power generation cycles, the principles disclosed herein also apply to other substances having a critical temperature and a critical pressure similar to that of carbon dioxide (critical temperature=548° R; critical pressure=1,071 psia). Such substances should be considered as included as part of this disclosure. Non-limiting examples of such materials include, but are not limited to: ethane (critical temperature=550° R; critical pressure=708 psia); ethylene (critical temperature=509° R; critical pressure=735 psia); nitrous oxide (critical temperature=557°R; critical pressure=1048 psia); and similar.

Figure 1:
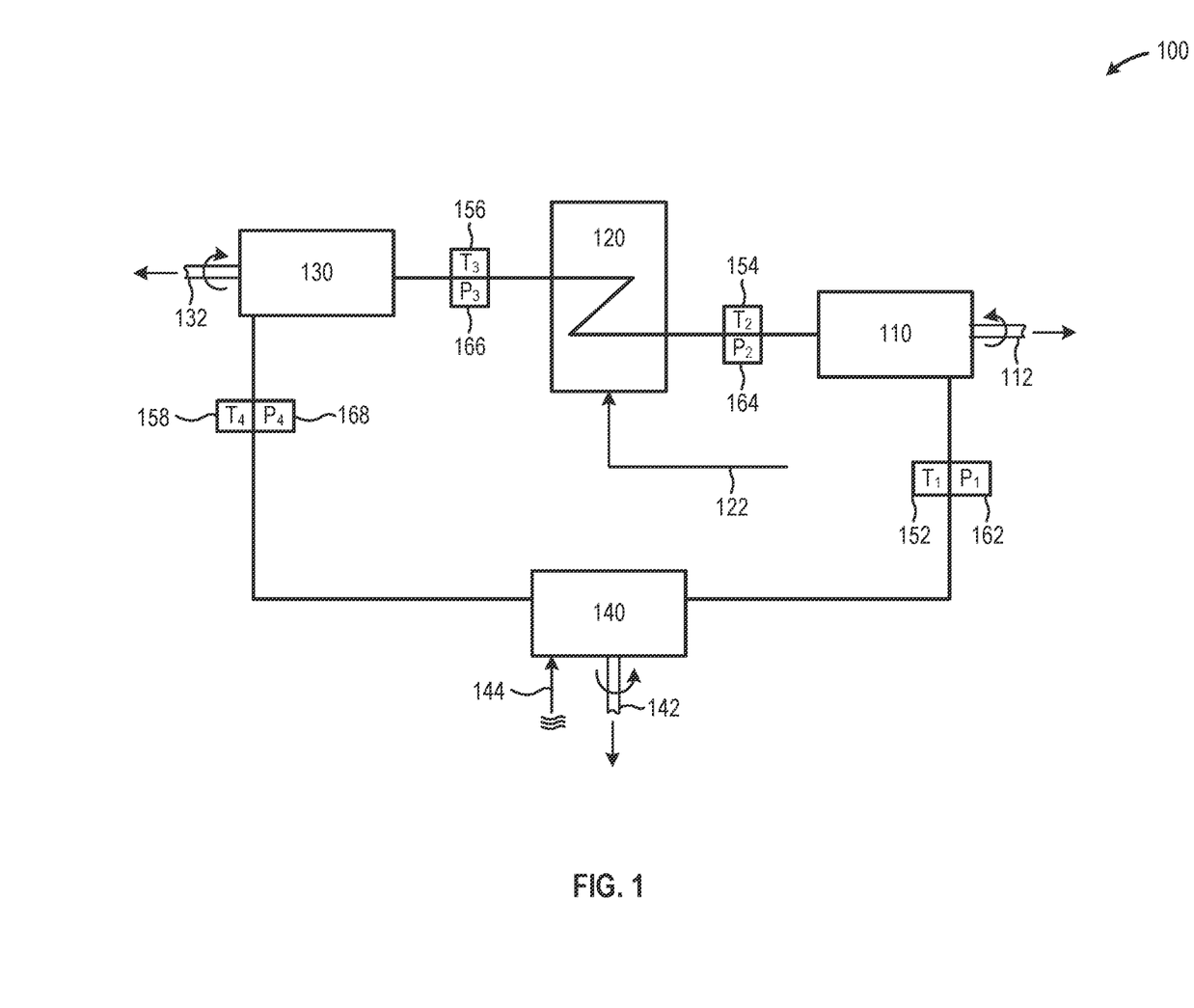
FIG. 1 is a block flow diagram of an illustrative supercritical $CO_2$ power generation system that includes a first $CO_2$ expansion system, a heater to receive and heat the supercritical $CO_2$ from the first $CO_2$ expansion system, and a second $CO_2$ expansion system to receive the heated supercritical $CO_2$ from the heater, in accordance with at least one embodiment described herein.

FIG. 1 is a block flow diagram of an illustrative supercritical $CO_2$ power generation system 100 that includes a first $CO_2$ expansion system 110, a heater 120 to receive and heat the supercritical $CO_2$ from the first $CO_2$ expansion system 110, and a second $CO_2$ expansion system 130 to receive the heated supercritical $CO_2$ from the heater 120, in accordance with at least one embodiment described herein. The expansion of the relatively high-pressure supercritical $CO_2$ through the first $CO_2$ expansion system 110 generates a first power output 112. The heater 120 receives the intermediate pressure (rather than the relatively high-pressure) supercritical $CO_2$. Similarly, the expansion of the heated supercritical $CO_2$ through the second $CO_2$ expansion system 130 generates a second power output 132. The system 100 may also include a $CO_2$ compressor system 140 to receive gaseous $CO_2$ exiting the second $CO_2$ expansion system 130. The $CO_2$ compressor system 140 receives a power input 142 to increase the pressure of the gaseous $CO_2$ above the critical pressure of $CO_2$ and uses one or more thermal inputs 144 to increase the temperature of the received $CO_2$ above the critical temperature of $CO_2$ to provide supercritical $CO_2$, at least a portion of which is returned to the first $CO_2$ expansion system 110. In embodiments, at least a portion of the first power output 112 and/or at least a portion of the second power output 132 may provide all or a portion of the power input 142 to the $CO_2$ compressor system 140.

The first $CO_2$ expansion system 110 receives supercritical $CO_2$ at a first temperature ($T_1$) 152 and a first pressure ($P_1$) 162. In embodiments, the supercritical $CO_2$ provided to the first $CO_2$ expansion system 110 may have a first temperature 152 of: about 1,100° R to about 2,000° R; about 1,100° R to about 1,700° R; or about 1,100° R to about 1,400° R. In embodiments, the supercritical $CO_2$ provided to the first $CO_2$ expansion system may have a first pressure 162 of: about 3,000 psia to about 6,000 psia; about 3,500 psia to about 5,500 psia; or about 4,000 psia to about 5,000 psia. Within the first $CO_2$ expansion system 110, the relatively high-temperature supercritical $CO_2$ expands through one or more turbines or turbine stages to produce the first power output 112. The supercritical $CO_2$ exits the first $CO_2$ expansion system 110 at an intermediate second temperature ($T_2$) 154 and a second pressure ($P_2$) 164. In embodiments, the supercritical $CO_2$ exiting the first $CO_2$ expansion system 110 may have a second temperature 154 of: about 800° R to about 1,500° R; about 900° R to about 1,300° R; or about 1,000° R to about 1,200° R. In embodiments, the intermediate pressure supercritical $CO_2$ exiting the first $CO_2$ expansion system 110 may have a second pressure 164 of: about 1,071 psia to about 2,000 psia; about 1,071 psia to about 1,700 psia; or about 1,071 psia to about 1,500 psia.

The first $CO_2$ expansion system 110 may include any number and/or combination of currently available or future developed systems and/or devices capable of receiving supercritical $CO_2$ at the first temperature 152 and the first pressure 162, expanding the supercritical $CO_2$ to the second temperature 154 and the second pressure 164, and producing the first power output 112. In embodiments, the first $CO_2$ expansion system 110 may include one or more single- or multi-stage turboexpanders arranged in series or parallel. In embodiments, the first power output 112 may include a rotating shaft output that may be used to provide all or a portion of the power input 142 to the $CO_2$ compressor system 140. In embodiments, the first power output 112 may include a rotating shaft output that may be used to provide all or a portion of a power input to an electrical production device or system, such as an electrical generator.

The heater 120 may include any currently available or future developed device, system, or combination of devices capable of supplying thermal energy to and/or raising the temperature of the intermediate pressure supercritical $CO_2$ received from the first $CO_2$ expansion system 110. The heater 120 may include one or more thermal energy production and/or collection devices and/or systems. Example thermal energy collection systems include, but are not limited to: solar reflector arrays. Example thermal energy production systems include, but are not limited to: nuclear reactors, combustors, waste heat generators, and similar. In embodiments, the heater 120 may include a single- or a multi-stage combustor. In embodiments, the heater 120 may include one or more direct-fired combustors. In embodiments, the heater 120 may include one or more direct-fired combustors. In embodiments, the heater 120 may include one or more indirect-fired heat exchangers. In embodiments, the heater 120 may include a combination that includes one or more direct-fired combustors and one or more indirect-fired combustors.

The heater 120 receives all or a portion the intermediate pressure supercritical $CO_2$ from the first $CO_2$ expansion system 110. In some embodiments, the combustion of a fuel source 122 within the heater 120 provides at least a portion of the thermal energy used to raise the temperature of the intermediate pressure supercritical $CO_2$ received from the first $CO_2$ expansion system 110. In embodiments, the fuel source 122 may include one or more solid fuels, such as coal and/or biomass. In some embodiments, the fuel source 122 may include one or more hydrocarbons, natural gas, propane, waste gas streams, or combinations thereof. In embodiments, the heater 120 may increase the temperature of the intermediate pressure supercritical $CO_2$ received from the first $CO_2$ expansion system 110 by: about 800° R or more; about 1,200° R or more; or about 1,600° R. In embodiments, the heater 120 may operate at a substantially constant pressure (i.e., a substantially isobaric operation). In embodiments, the heater 120 may operate at a pressure of: about 1,072 psia or greater; about 1,200 psia or greater; or about 1,500 psia or greater. In embodiments, the heater 120 may operate at a supercritical $CO_2$ pressure of: less than about 3,000 psia; less than about 2,000 psia; or less than about 1,500 psia.

The first $CO_2$ expansion system 110 reduces the pressure of the supercritical $CO_2$ from a relatively high pressure (e.g., the first pressure 162, for example 4,500 psia) to a lower, intermediate, pressure (e.g., the second pressure 164, for example 1,100 psia). Reducing the pressure of the supercritical $CO_2$ entering the heater 120 to the lower, intermediate, pressure beneficially permits the operation of the heater 120 at lower pressures, thereby permitting the use of lower cost materials in fabrication, particularly when compared to heaters and/or thermal energy input devices operated at higher supercritical $CO_2$ pressures, such as: greater than about 2,000 psia; greater than about 3,000 psia; or, greater than about 4,000 psia.

The heated supercritical $CO_2$ exits the heater 120 at a third temperature ($T_3$) 156 and a third pressure ($P_3$) 166. In embodiments, the supercritical $CO_2$ exiting the heater 120 may be at a third temperature 156 of: about 1,500° R to about 2,500° R; about 1,800° R to about 2,200° R; or about 1,900° R to about 2,100° R. In embodiments, the supercritical $CO_2$ exiting the heater 120 may have a third pressure 166 of: about 1,071 psia to about 2,000 psia; about 1,071 psia to about 1,700 psia; or about 1,071 psia to about 1,500 psia.

The second $CO_2$ expansion system 130 receives the heated supercritical $CO_2$ from the heater 120 at the third temperature 156 and the third pressure 166. Within the second $CO_2$ expansion system 130, the supercritical $CO_2$ expands in, on, about, or through one or more turbines or turbine stages to produce the second power output 132. The expansion of the supercritical $CO_2$ through the second $CO_2$ expansion system 130 cools and reduces the pressure of the $CO_2$. In embodiments, the cooled and expanded $CO_2$ exits the second $CO_2$ expansion system 130 as gaseous $CO_2$ at a fourth temperature ($T_4$) 158 and a fourth pressure ($P_4$) 168. In embodiments, the gaseous $CO_2$ exiting the second $CO_2$ expansion system 130 may be at a fourth temperature 158 of: about 1,400° R to about 2,100° R; about 1,500° R to about 2,000° R; or about 1,600° R to about 1,800° R. In embodiments, the gaseous $CO_2$ exiting the second $CO_2$ expansion system 130 may be at a fourth pressure 168 of: about 200 psia to about 1,000 psia; about 300 psia to about 800 psia; or about 400 psia to about 600 psia.

The second $CO_2$ expansion system 130 may include any number and/or combination of currently available or future developed systems and/or devices capable of receiving supercritical $CO_2$ from the heater 120 at the third temperature 156 and the third pressure 166, expanding the supercritical $CO_2$ to provide the gaseous $CO_2$ at the fourth temperature 158 and the fourth pressure 158, and producing the second power output 132. The second $CO_2$ expansion system 110 may include a single- or multi-stage turbine and/or turboexpander. In embodiments, the second power output 132 may include a rotating shaft output that may be used to provide all or a portion of the power input 142 to the $CO_2$ compressor system 140. In embodiments, the second power output 132 may include a rotating shaft output that may be used to provide all or a portion of a power input to an electrical production device or system, such as an electrical generator.

The $CO_2$ compressor system 140 receives the gaseous $CO_2$ at the fourth temperature 158 and the fourth pressure 168 from the second $CO_2$ expansion system 130. In embodiments, the $CO_2$ compressor system 140 compresses the gaseous $CO_2$ to provide at least a portion of the supercritical $CO_2$ at the first temperature 152 and the first pressure 162 to the first $CO_2$ expansion system 110. In open-loop or direct-fired processes, the $CO_2$ compressor system 140 may apportion the $CO_2$ received from the second $CO_2$ expansion system 130 into a first portion that is heated and compressed to provide supercritical $CO_2$ at the first temperature 152 and the first pressure 162 and a second portion that may be discharged as liquid $CO_2$, gaseous $CO_2$, supercritical $CO_2$, or any combination thereof. In closed-loop or indirect-fired processes, the $CO_2$ compressor system 140 may return substantially all of the gaseous $CO_2$ received from the second $CO_2$ expansion system 130 to the first $CO_2$ expansion system 110 at the first temperature 152 and the first pressure 162.

The $CO_2$ compressor system 140 may include any number and/or combination of systems and/or devices capable of compressing the gaseous $CO_2$ from the second $CO_2$ expansion system 130 to provide supercritical $CO_2$ at the first temperature 152 and the first pressure 162 to the first $CO_2$ expansion system 110. In embodiments, the $CO_2$ compressor system 140 may include any number and/or combination of heat exchangers, recuperators, coolers, chillers, condensers, compressors, and/or pumps. In embodiments, the $CO_2$ compressor system 140 receives a power input 142 used to cool and/or compress the gaseous $CO_2$ received from the second $CO_2$ expansion system 130. In embodiments, the $CO_2$ compressor system 140 may receive one or more thermal energy inputs 144.

Figure 2:
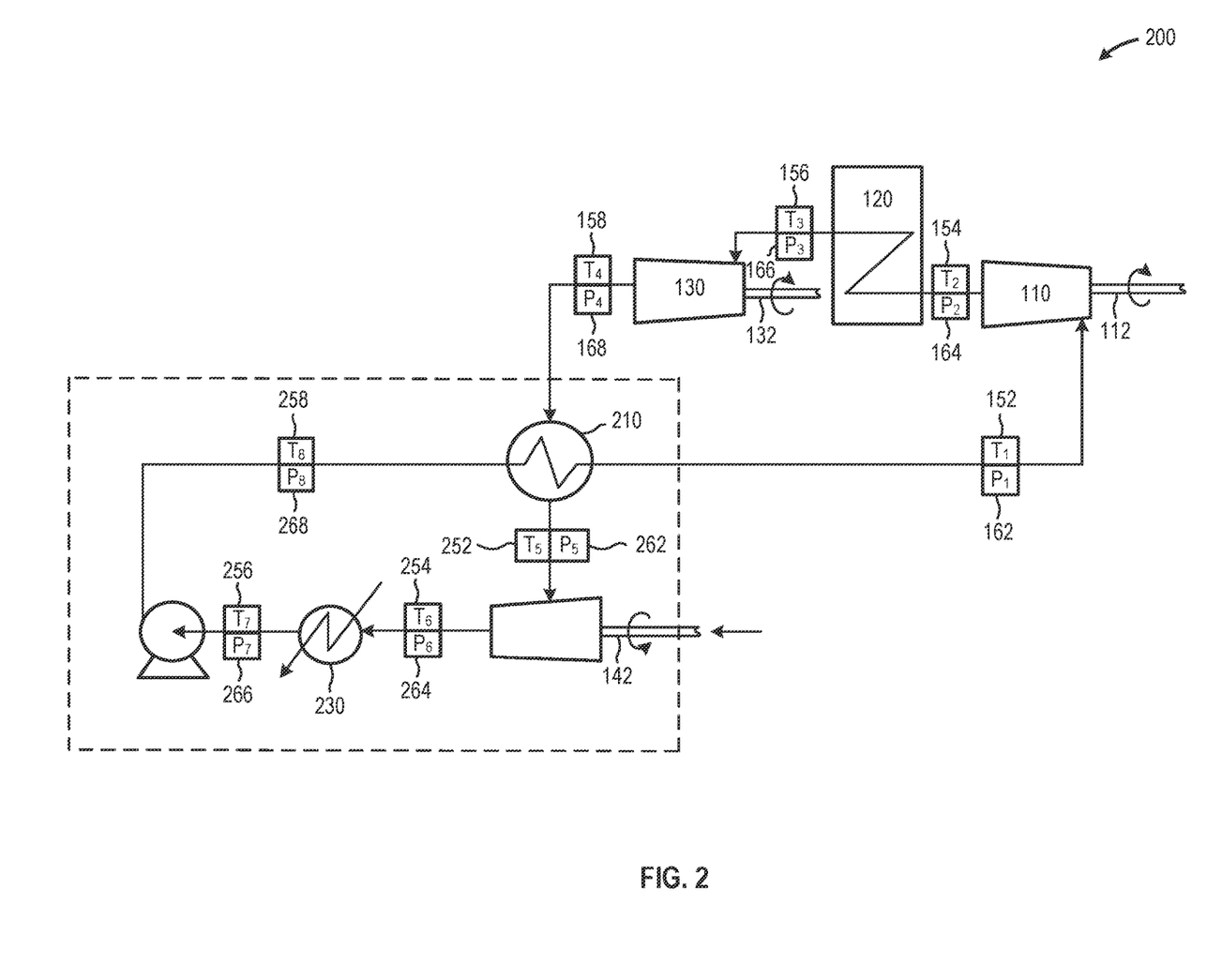
FIG. 2 is a block flow diagram of an illustrative supercritical $CO_2$ power generation cycle in which the $CO_2$ compressor system includes a recuperators, a compressor, a condenser, and a fluid mover that returns supercritical $CO_2$ to the recuperator and to the first $CO_2$ expansion system, in accordance with at least one embodiment described herein.

FIG. 2 is a block flow diagram of an illustrative supercritical $CO_2$ power generation cycle 200 in which the $CO_2$ compressor system 140 includes a recuperators 210, a compressor 220, a condenser 230, and a fluid mover 240 that returns supercritical $CO_2$ to the recuperator 210 and to the first $CO_2$ expansion system 110, in accordance with at least one embodiment described herein. In such embodiments, the compressor 220 may receive all or a portion of the power input 142. In such embodiments, the first power output 112 provided by the first $CO_2$ expansion system 110 and/or the second power output 132 provided by the second $CO_2$ expansion system 130 may provide all or a portion of the power input 142 to the compressor 220. In other embodiments, all or a portion of the power input 142 to the compressor 220 may be provided via a private or commercial electrical distribution system.

In supercritical $CO_2$ power generation cycle 200, the gaseous $CO_2$ from the second $CO_2$ expansion system 130 is cooled through the recuperator 210. The cooled $CO_2$ is compressed using compressor 220 and condensed to liquid $CO_2$ using condenser 230. The pressure of the liquid $CO_2$ is increased using fluid mover 240 and the liquid $CO_2$ is heated by the gaseous $CO_2$ discharged by the second $CO_2$ expansion system 130 using the recuperator 210. All or a portion of the supercritical $CO_2$ exiting the recuperator 210 is returned to the first $CO_2$ expansion system 110.

The recuperator 210 transfers at least a portion of the thermal energy carried by the gaseous $CO_2$ exiting the second $CO_2$ expansion system 130 to the liquefied, relatively high-pressure, $CO_2$ discharged by the fluid mover 240. In embodiments, the recuperator 210 may include any number and/or combination of currently available or future developed heat transfer systems or devices. Example heat transfer devices include, but are not limited to: plate and frame heat exchangers; shell and tube heat exchangers; microchannel heat exchangers; and similar. Recuperator 210 selection may be based on any number of factors that include, but are not limited to: gaseous $CO_2$ inlet temperature (i.e., fourth temperature 158); target gaseous $CO_2$ outlet temperature/desired compressor inlet temperature (i.e., fifth temperature 252); liquefied $CO_2$ inlet temperature (i.e., eighth temperature 258); target supercritical $CO_2$ outlet temperature (i.e., first temperature 152); gaseous $CO_2$ flowrate; liquefied $CO_2$ flowrate; or combinations thereof.

The recuperator 210 receives the gaseous $CO_2$ from the second $CO_2$ expansion system 130 at the fourth temperature 158 and the fourth pressure 168 and discharges the gaseous $CO_2$ at a fifth temperature ($T_5$) 252 and a fifth pressure ($P_5$) 262. In embodiments, the recuperator 210 discharges the gaseous $CO_2$ at a fifth temperature 252 of: about 460° R to about 1,200° R; about 460° R to about 800° R; or about 460° R to about 600° R. In embodiments, the recuperator 210 discharges the gaseous $CO_2$ at a fifth pressure 262 of: about 200 psia to about 1,000 psia; about 300 psia to about 800 psia; or about 400 psia to about 600 psia.

The compressor 220 may include any number and/or combination of currently available and/or future developed systems and/or devices capable of increasing the pressure of the cooled gaseous $CO_2$ received from the recuperator 210 to provide a compressed gaseous $CO_2$ at a sixth temperature ($T_6$) 254 and a sixth pressure ($P_6$) 264. In embodiments, the compressor 220 may include one or more reciprocating compressors, one or more rotary compressors, one or more scroll compressors, or combinations thereof. In embodiments, the compressor 220 may include one or more single- or multi-stage supersonic compressors that increase the density of the $CO_2$ using a supersonic shockwave. Compressor 220 selection may be based on one or more factors, such as process operating conditions (e.g., the fifth temperature 252 and the fifth pressure 262); desired output conditions (e.g., the sixth temperature 254 and/or the sixth pressure 264); gaseous $CO_2$ flowrate; or any combination thereof. In embodiments, the compressor 220 receives a power input 142. In embodiments, the power input 142 may include all or a portion of the first power output 112 provided by the first $CO_2$ expansion system 110 and/or the second power output 132 provided by the second $CO_2$ expansion system 130.

The compressor 220 receives the cooled gaseous $CO_2$ at the fifth temperature 252 and the fifth pressure 262 and compresses the gaseous $CO_2$ to the sixth temperature 254 and the sixth pressure 264. In embodiments, the compressor 220 discharges the compressed gaseous $CO_2$ at a sixth temperature 254 of: about 500° R to about 1,200° R; about 500° R to about 900° R; or about 500° R to about 700° R. In embodiments, the compressor 220 discharges the compressed gaseous $CO_2$ at a sixth pressure 264 of: about 500 psia to about 1,500 psia; about 600 psia to about 1,200 psia; or about 700 psia to about 900 psia.

The condenser 230 receives all or a portion of the compressed gaseous $CO_2$ at the sixth temperature 254 and the sixth pressure 264 exiting the compressor 220. The condenser 230 may include any number and/or combination of currently available and/or future developed systems and/or devices capable of liquifying all or a portion of the compressed gaseous $CO_2$ received from the compressor 220 to provide a liquefied $CO_2$ at a seventh temperature 256 ($T_7$) and a seventh pressure 266 ($P_7$). In embodiments, the condenser 230 may include one or more liquid-cooled condensers; one or more air-cooled condensers, or combinations thereof. Condenser 230 selection may be based on one or more factors, such as process operating conditions (e.g., the sixth temperature 254 and/or the sixth pressure 264); desired output conditions (e.g., the seventh temperature 256 and/or the seventh pressure 266); gaseous $CO_2$ flowrate from the compressor 220; or any combination thereof. In embodiments, the condenser 230 may operate at a substantially constant pressure (i.e., a substantially isobaric operating regime).

The condenser 230 receives the compressed gaseous $CO_2$ at the sixth temperature 254 and the sixth pressure 264 and discharges liquefied $CO_2$ at the seventh temperature 256 and the seventh pressure 266. In embodiments, the condenser 230 discharges the liquefied $CO_2$ at a seventh temperature 256 of: about 400° R to about 800° R; about 450° R to about 800° R; or about 500° R to about 700° R. In embodiments, the condenser 230 discharges the liquefied $CO_2$ at a seventh pressure 266 of: about 500 psia to about 1,500 psia; about 600 psia to about 1,200 psia; or about 700 psia to about 900 psia.

The fluid mover 240 receives all or a portion of the liquefied $CO_2$ exiting the condenser 230 at the seventh temperature 256 and the seventh pressure 266. The fluid mover 240 may include any number and/or combination of currently available and/or future developed systems and/or devices capable of increasing the pressure of the liquefied $CO_2$ received from the condenser 230 to provide a relatively high-pressure liquefied $CO_2$ at an eighth temperature ($T_8$) 258 and an eighth pressure ($P_8$) 268. Fluid mover 240 selection may be based on any number of factors including, but not limited to: liquefied $CO_2$ flowrate; target discharge pressure; or combinations thereof. In embodiments, the fluid mover 240 may include one or more single- or multi-stage centrifugal pumps; one or more single- or multi-stage reciprocating pumps; one or more single- or multi-stage positive-displacement pumps; or combinations thereof.

The fluid mover 240 receives the liquefied $CO_2$ at the seventh temperature 256 and the seventh pressure 266 and discharges the relatively high-pressure liquefied $CO_2$ at the eighth temperature 258 and the eighth pressure 268. In embodiments, the fluid mover 240 discharges the relatively high-pressure liquefied $CO_2$ at an eighth temperature 258 of: about 400° R to about 800° R; about 450° R to about 800° R; or about 500° R to about 700° R. In embodiments, the fluid mover 240 discharges the relatively high-pressure $CO_2$ In embodiments, the fluid mover 240 discharges the relatively high-pressure liquefied $CO_2$ at an eighth pressure 268 of: about 2,000 psia to about 6,000 psia; about 2,000 psia to about 5,000 psia; or about 2,000 psia to about 4,000 psia.

All or a portion of the relatively high-pressure liquefied $CO_2$ discharged from the fluid mover 240 flows through the recuperator 210. Within the recuperator 210, the temperature of the relatively high-pressure liquefied $CO_2$ is increased using thermal energy transferred from the gaseous $CO_2$ discharged from the second $CO_2$ expansion system 130. The recuperator 210 raises the temperature of the relatively high-pressure $CO_2$ exiting the fluid mover 240 to provide the supercritical $CO_2$ at the first temperature 152 and the first pressure 162. All or a portion of the supercritical $CO_2$ exiting the recuperator 210 at the first temperature 152 and the first pressure 162 is recycled to the first $CO_2$ expansion system 110.

Figure 3:
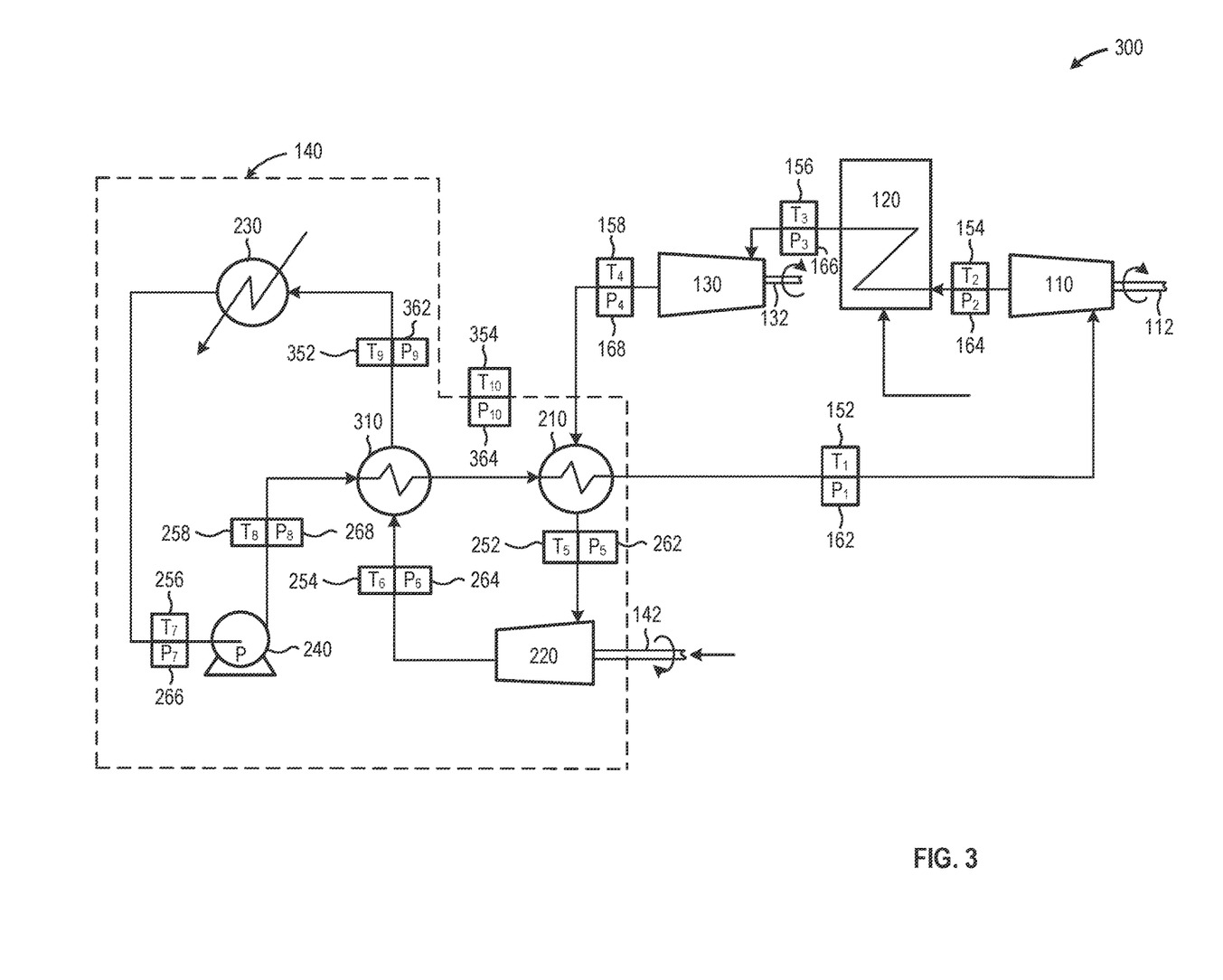
FIG. 3 is a block flow diagram of an illustrative supercritical $CO_2$ power generation cycle in which the $CO_2$ compressor system includes the recuperator, a second recuperator, the compressor, the condenser, and the fluid mover that returns liquefied $CO_2$ to the recuperator, in accordance with at least one embodiment described herein.

FIG. 3 is a block flow diagram of an illustrative supercritical $CO_2$ power generation cycle 300 in which the $CO_2$ compressor system 140 includes the recuperator 210, a second recuperator 310, the compressor 220, the condenser 230, and the fluid mover 240 that returns liquefied $CO_2$ to the recuperator 210, in accordance with at least one embodiment described herein. In some embodiments, the liquefied $CO_2$ exiting the second recuperator 310 may be at a supercritical state. In some embodiments, the liquefied $CO_2$ exiting the second recuperator 310 may be at an elevated temperature and/or pressure, but in a non-supercritical state. The second recuperator 310 cools at least a portion of the gaseous $CO_2$ exiting the compressor 220 (i.e., decreases the sixth temperature 254) and warms at least a portion of the liquefied $CO_2$ exiting the fluid mover 240 (i.e., increases the eighth temperature 258). By capturing at least a portion of the thermal energy in the compressed gaseous $CO_2$ exiting the compressor 220, the second recuperator 310 improves the thermal efficiency of the supercritical $CO_2$ power generation cycle 300.

The second recuperator 310 receives and cools a relatively high-temperature gaseous $CO_2$ at the sixth temperature 254 and the sixth pressure 264 from the compressor 220. The compressed gaseous $CO_2$ exits the second recuperator 310 at a ninth temperature 352 that is intermediate between the sixth temperature 254 and the seventh temperature 256. The compressed gaseous $CO_2$ exits the second recuperator 310 at a ninth pressure that may be the same as or intermediate between the sixth pressure 264 and the seventh pressure 266. The second recuperator 310 receives and warms the high-pressure liquefied $CO_2$ at the eighth temperature 258 and the eighth pressure 268 discharged from the fluid mover 240. The liquefied $CO_2$ or supercritical $CO_2$ exits the second recuperator 310 at a tenth temperature 354 that is intermediate between the eighth temperature 258 and the first temperature 152. The liquefied $CO_2$ or supercritical $CO_2$ exits the second recuperator 310 at a tenth pressure 364 that is the same as or intermediate between the eighth pressure 268 and the first pressure 162.

The second recuperator 310 may include any number and/or combination of currently available or future developed heat transfer systems or devices. Example heat transfer devices include, but are not limited to: plate and frame heat exchangers; shell and tube heat exchangers; microchannel heat exchangers; and similar. Second recuperator 310 selection may be based on any number of factors that include, but are not limited to: gaseous $CO_2$ inlet temperature (i.e., sixth temperature 254); target gaseous $CO_2$ outlet temperature/desired condenser inlet temperature; liquefied $CO_2$ inlet temperature (i.e., eighth temperature 258); target liquid or supercritical $CO_2$ outlet temperature; gaseous $CO_2$ flowrate; liquefied $CO_2$ flowrate; or combinations thereof.

Figure 4:
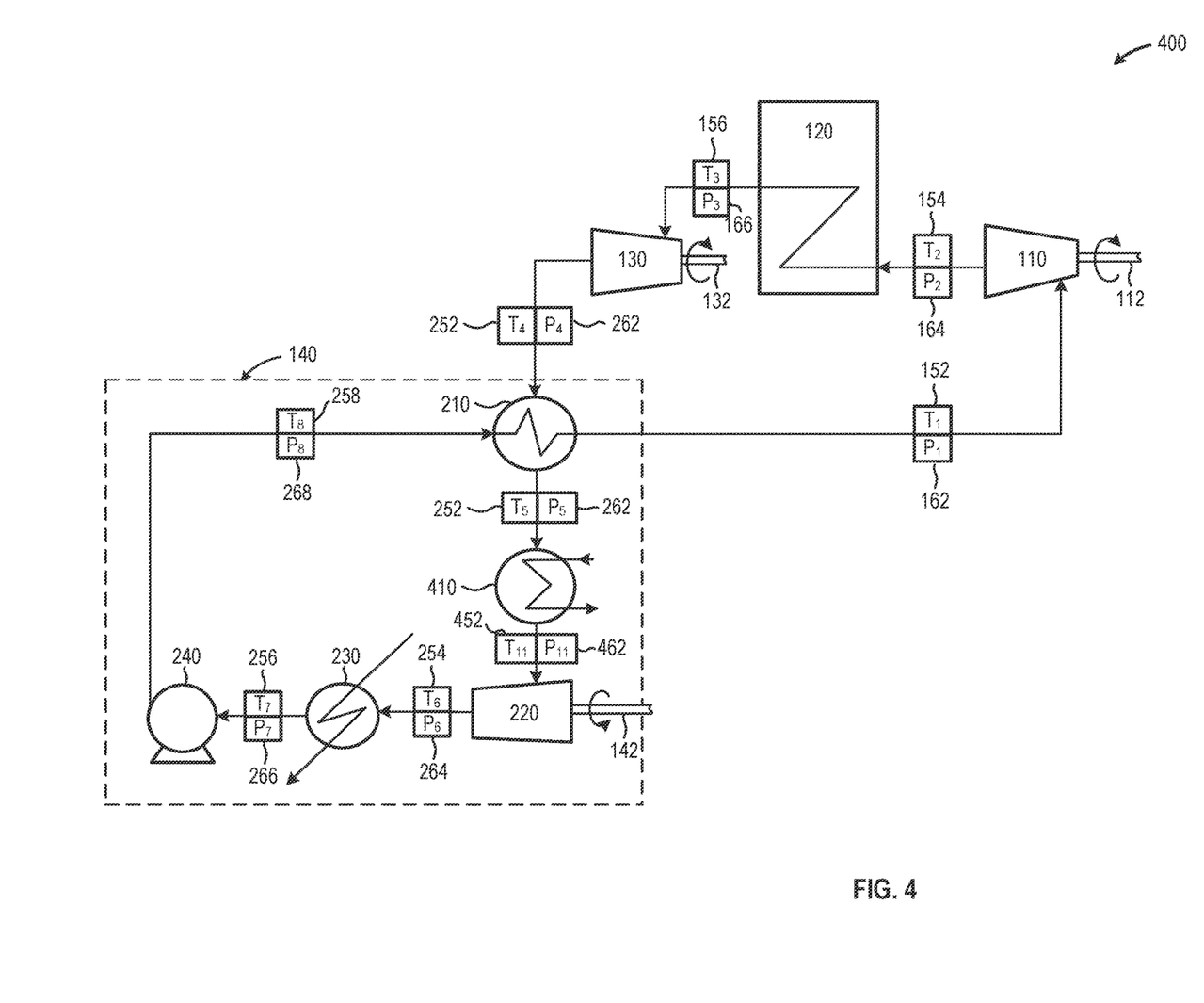
FIG. 4 is a block flow diagram of an illustrative supercritical $CO_2$ power generation cycle in which the $CO_2$ compressor system 140 includes the recuperator, the compressor, the condenser, the fluid mover, and a chiller that reduces the temperature of the gaseous $CO_2$ discharged from the recuperator prior to introducing the gaseous $CO_2$ to the compressor, in accordance with at least one embodiment described herein.

FIG. 4 is a block flow diagram of an illustrative supercritical $CO_2$ power generation cycle 400 in which the $CO_2$ compressor system 140 includes the recuperator 210, the compressor 220, the condenser 230, the fluid mover 240, and a chiller 410 that reduces the temperature of the gaseous $CO_2$ discharged from the recuperator 210 (i.e., the fifth temperature 252) prior to introducing the gaseous $CO_2$ to the compressor 220, in accordance with at least one embodiment described herein. The chiller 410 receives the gaseous $CO_2$ at the fifth temperature 252 and the fifth pressure 262 from the recuperator 210. The gaseous $CO_2$ exits the chiller 410 at an eleventh temperature 452 that is less than the fifth temperature 252. The gaseous $CO_2$ exits the chiller 410 at an eleventh pressure 462 that may be the same as or less than the fifth pressure 262.

The chiller 410 may include any number and/or combination of currently available or future developed heat transfer systems or devices suitable for reducing the temperature of the gaseous $CO_2$ exiting the recuperator 210. In embodiments, the chiller may include one or more air cooled chillers, one or more liquid cooled (water, glycol, brine, etc.) chillers, or combinations thereof. Chiller 410 selection may be based on any number of factors that include, but are not limited to: gaseous $CO_2$ inlet temperature (i.e., fifth temperature 252); target gaseous $CO_2$ outlet temperature/desired compressor inlet temperature; gaseous $CO_2$ flowrate; or combinations thereof.

Figure 5:
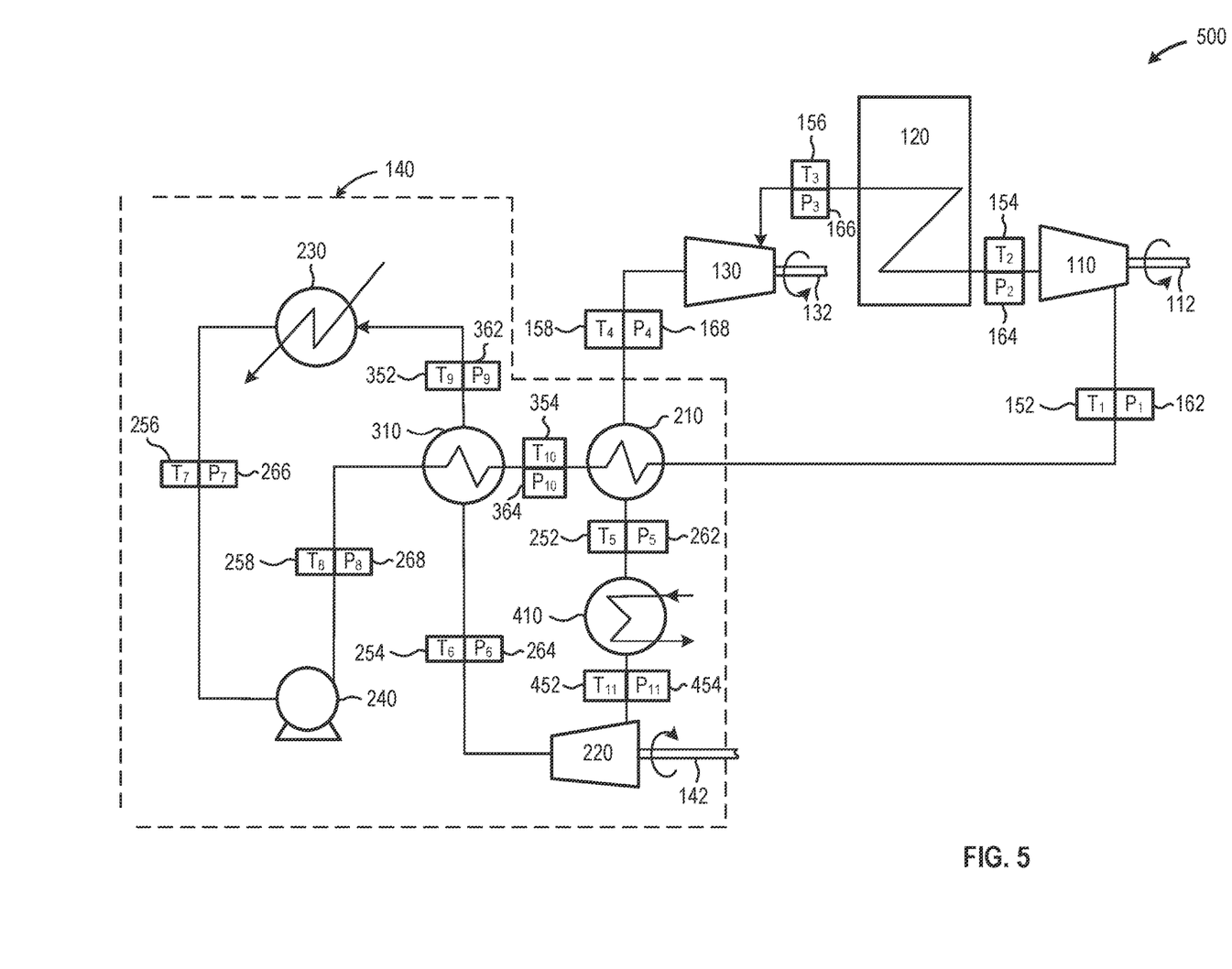
FIG. 5 is a block flow diagram of an illustrative supercritical $CO_2$ power generation system in which the $CO_2$ compressor system includes the recuperator, the chiller, the compressor, the second recuperator, the condenser, and the fluid mover, in accordance with at least one embodiment described herein.

FIG. 5 is a block flow diagram of an illustrative supercritical $CO_2$ power generation system 500 in which the $CO_2$ compressor system 140 includes the recuperator 210, the chiller 410, the compressor 220, the second recuperator 310, the condenser 230, and the fluid mover 240, in accordance with at least one embodiment described herein. As depicted in the supercritical $CO_2$ power generation system 500, the gaseous $CO_2$ at the fourth temperature 158 and the fourth pressure 168 that exits the second $CO_2$ expansion system 130 flows through the recuperator 210 where the gaseous $CO_2$ is cooled (to the fifth temperature 252 and the fifth pressure 262) and enters the chiller 410 where the gaseous $CO_2$ is further cooled (to the eleventh temperature 452 and the eleventh pressure 462). The cooled gaseous $CO_2$ enters the compressor 220 and is discharged as compressed gaseous $CO_2$ (at the sixth temperature 254 and the sixth pressure 264). The second recuperator 310 receives the gaseous $CO_2$ from the compressor and is further cools the gaseous $CO_2$ (to the ninth temperature 352 and the ninth pressure 362). The condenser 230 condenses the gaseous $CO_2$ to provide liquefied $CO_2$ (at the seventh temperature 256 and the seventh pressure 266). The fluid mover 240 receives the liquefied $CO_2$ and discharges a relatively low-temperature, relatively high-pressure, liquefied $CO_2$ (at the eighth temperature 258 and the eighth pressure 268). The liquefied $CO_2$ from the fluid mover 240 passes through the second recuperator 310 and the recuperator 210 which raise the temperature of the liquefied $CO_2$ (to the first temperature 152 and the first pressure 162) sufficient to provide supercritical $CO_2$ to the first $CO_2$ expansion system 110.

Figure 6:
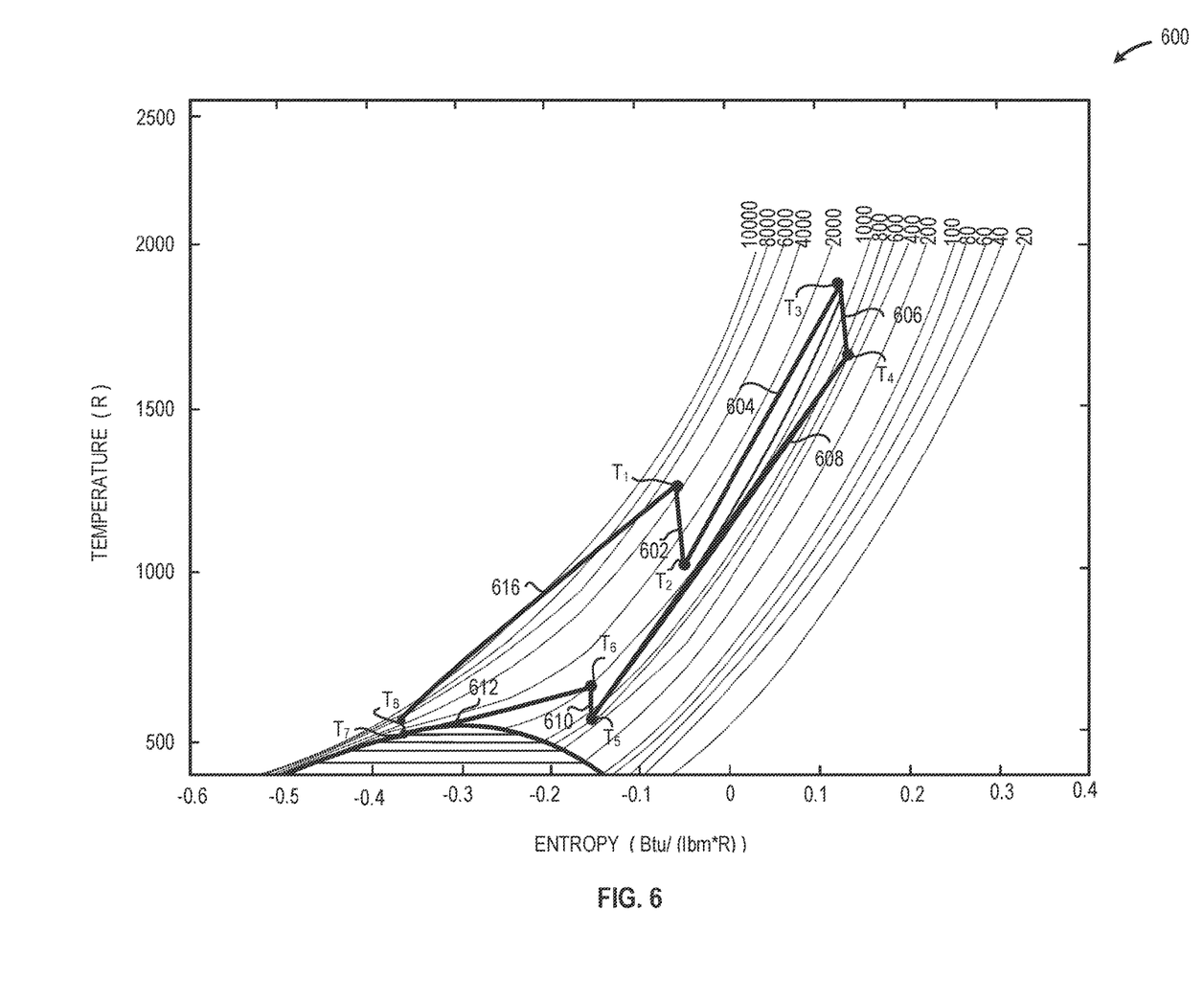
FIG. 6 is a temperature/entropy (t-S) diagram that depicts an illustrative supercritical $CO_2$ power generation cycle, such as depicted in FIG. 2, in accordance with at least one embodiment described herein.

FIG. 6 is a temperature/entropy (t-S) diagram 600 that depicts an illustrative supercritical $CO_2$ power generation cycle, such as depicted in FIG. 2, in accordance with at least one embodiment described herein. In the example power generation cycle depicted in FIG. 6, at 602, supercritical $CO_2$ at the first temperature ($T_1$) 152 expands through the first $CO_2$ expansion system 110. The substantially isentropic expansion through the first supercritical $CO_2$ expansion system 110 causes the supercritical $CO_2$ to cool to the second temperature ($T_2$) 154. The expansion of the supercritical $CO_2$ through the first $CO_2$ expansion system 110 produces the first power output 112.

At 604, the temperature of the supercritical $CO_2$ from the first $CO_2$ expansion system 110 is increased to the third temperature ($T_3$) 156 by passing the supercritical $CO_2$ through the heater 120.

At 606, the supercritical $CO_2$ expands through the second $CO_2$ expansion system 130. The substantially isentropic expansion through the second supercritical $CO_2$ expansion system 130 causes the supercritical $CO_2$ to cool to the fourth temperature ($T_4$) 158. The expansion of the supercritical $CO_2$ through the second $CO_2$ expansion system 130 produces the second power output 132. The supercritical $CO_2$ exits the second $CO_2$ expansion system 130 as gaseous $CO_2$.

At 608, the gaseous $CO_2$ passes through the recuperator 210 and is cooled to the fifth temperature ($T_5$) 252.

At 610 the cooled gaseous $CO_2$ passes through the compressor 220. The substantially isentropic compression of the gaseous $CO_2$ within the compressor 220 increases the temperature of the gaseous $CO_2$ to the sixth temperature ($T_6$) 254.

At 612, the compressed $CO_2$ passes through the condenser 230. Within the condenser 220, the gaseous $CO_2$ condenses and exits as liquefied $CO_2$ at the seventh temperature ($T_7$) 256.

At 614, the liquefied $CO_2$ passes through the fluid mover 240. Within the fluid mover, the pressure of the liquefied $CO_2$ is increased to a relatively high pressure and the temperature of the relatively high pressure, liquefied, $CO_2$ is slightly increased to the eighth temperature ($T_8$) 258.

At 616, the relatively high pressure, liquefied, $CO_2$ passes through the recuperator 210 where the temperature of the relatively high pressure, liquefied, $CO_2$ increases to the first temperature ($T_1$) 152, providing supercritical $CO_2$ to the first $CO_2$ expansion system 110.

Figure 7:
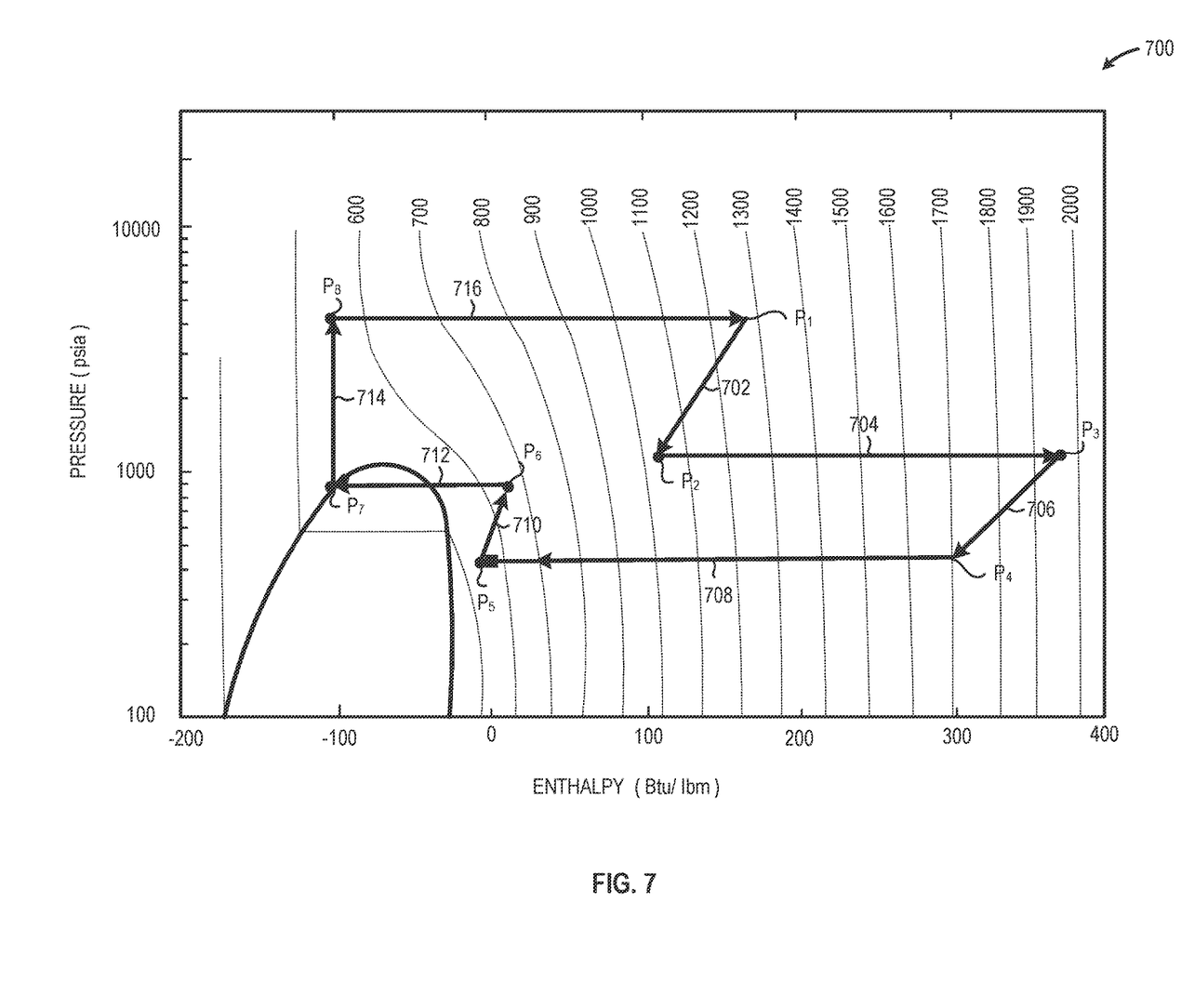
FIG. 7 is a pressure/enthalpy (P-h) diagram that depicts an illustrative supercritical $CO_2$ power generation cycle, such as depicted in FIG. 2, in accordance with at least one embodiment described herein.

FIG. 7 is a pressure/enthalpy (P-h) diagram 700 that depicts an illustrative supercritical $CO_2$ power generation cycle, such as depicted in FIG. 2, in accordance with at least one embodiment described herein. In the example power generation cycle depicted in FIG. 7, at 702, supercritical $CO_2$ at the first pressure ($P_1$) 162 expands through the first $CO_2$ expansion system 110. The substantially isentropic expansion through the first supercritical $CO_2$ expansion system 110 causes a reduction in pressure of the supercritical $CO_2$ to the second pressure ($P_2$) 164. The expansion and reduction in pressure of the supercritical $CO_2$ through the first $CO_2$ expansion system 110 produces the first power output 112.

At 704, the supercritical $CO_2$ from the first $CO_2$ expansion system 110 is maintained substantially isobaric (i.e., maintained at a substantially constant pressure) as the temperature of the supercritical $CO_2$ is increased by passing the supercritical $CO_2$ through the heater 120. The supercritical $CO_2$ exits the heater 120 at the third pressure ($P_3$) 166.

At 706, the supercritical $CO_2$ expands through the second $CO_2$ expansion system 130. The substantially isentropic expansion through the second supercritical $CO_2$ expansion system 130 causes a reduction in pressure of the supercritical $CO_2$ to the fourth pressure ($P_4$) 168. The expansion and reduction in pressure of the supercritical $CO_2$ through the second $CO_2$ expansion system 130 produces the second power output 132. The $CO_2$ exits the second $CO_2$ expansion system 130 as gaseous $CO_2$.

At 708, the gaseous $CO_2$ from the second $CO_2$ expansion system 130 is maintained substantially isobaric as the temperature of the supercritical $CO_2$ is reduced by passing the gaseous $CO_2$ through the recuperator 210. The gaseous $CO_2$ exits the recuperator 210 at the fifth pressure ($P_5$) 262.

At 710 the cooled gaseous $CO_2$ passes through the compressor 220. The substantially isentropic compression of the gaseous $CO_2$ within the compressor 220 increases the pressure of the gaseous $CO_2$ to the sixth pressure ($P_6$) 264.

At 712, the compressed $CO_2$ from the compressor 220 is maintained substantially isobaric as the gaseous $CO_2$ condenses within the condenser 230. The condensed/liquefied $CO_2$ exits the condenser 230 as liquefied $CO_2$ at the seventh pressure ($P_7$) 266.

At 714, the liquefied $CO_2$ passes through the fluid mover 240. The liquefied $CO_2$ exits the fluid mover 240 at the eighth pressure ($P_8$) 268.

At 716, the relatively high pressure, liquefied, $CO_2$ is maintained substantially isobaric as the temperature of the liquefied $CO_2$ is increased by passing the liquefied $CO_2$ through the recuperator 210. The supercritical $CO_2$ exits the recuperator 210 at the first pressure ($P_1$) 162.

Figure 8:
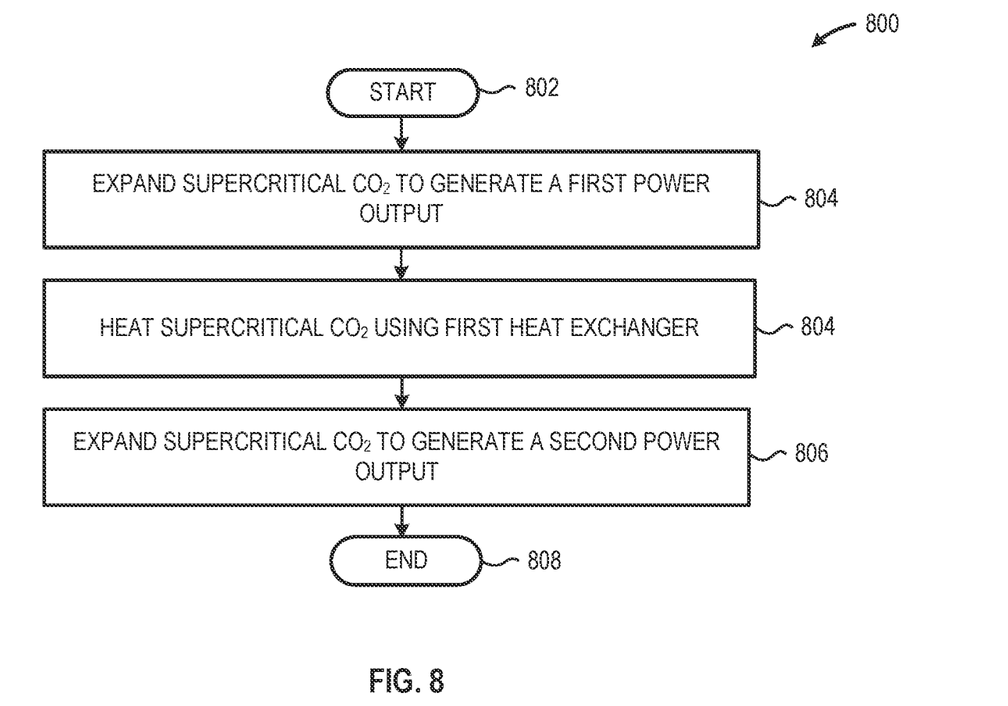
FIG. 8 is a high-level flow diagram of an illustrative supercritical $CO_2$ power generation method, in accordance with at least one embodiment described herein.

FIG. 8 is a high-level flow diagram of an illustrative supercritical $CO_2$ power generation method 800, in accordance with at least one embodiment described herein. The method 800 expands supercritical $CO_2$, reducing the pressure of the supercritical $CO_2$ prior to introducing the supercritical $CO_2$ to a heater 120 such as a direct- or indirect-fired combustor. Reducing the pressure of the supercritical $CO_2$ prior to the heater 120 beneficially and advantageously permits the use of less expensive materials of construction (e.g., materials of construction rated for relatively low pressure/high temperature applications rather than materials of construction rated for relatively high pressure/high temperature applications). In addition, operating the heater 120 at reduced pressures may beneficially improve the reliability and/or performance of the heater 120. The method 800 commences at 802.

At 802, the supercritical $CO_2$ at the first temperature 152 and the first pressure 162 is expanded through the first $CO_2$ expansion system 110 to provide supercritical $CO_2$ at the second temperature 154 and the second pressure 164. Expansion of the supercritical $CO_2$ through the first $CO_2$ expansion system 110 produces a first power output 112. In some implementations, the first $CO_2$ expansion system 110 may include any number and/or combination of currently available or future developed single- or multi-stage turbines, turboexpanders, or similar rotation-based systems or apparatuses capable of converting an expanding fluid to a rotating shaft output. In some implementations, the first $CO_2$ expansion system 110 may include any number and/or combination of currently available or future developed single- or multi-stage reciprocation-based systems or apparatuses capable of converting an expanding fluid to a power output.

At 804, the supercritical $CO_2$ exiting the first $CO_2$ expansion system 110 at the second temperature 154 and the second pressure 164 flows into the heater 120. The heater raises the temperature of the supercritical $CO_2$ to the third temperature 156. In some implementations, the heater 120 may include any number and/or combination of active thermal devices and/or systems (reactors, furnaces, etc.) that may be either directly-fired or indirectly-fired. In some implementations, the heater may include any number and/or combination of passive thermal devices and/or systems (solar energy collection systems, etc.).

At 806, the supercritical $CO_2$ at the third temperature 156 and a third pressure 166 is expanded through the second $CO_2$ expansion system 130 to provide gaseous $CO_2$ at the fourth temperature 158 and the fourth pressure 168. Expansion of the supercritical $CO_2$ through the second $CO_2$ expansion system 130 produces a second power output 132. In some implementations, the second $CO_2$ expansion system 130 may include any number and/or combination of currently available or future developed single- or multi-stage turbines, turboexpanders, or similar rotation-based systems or apparatuses capable of converting an expanding fluid to a rotating shaft output. In some implementations, the second $CO_2$ expansion system 130 may include any number and/or combination of currently available or future developed single- or multi-stage reciprocation-based systems or apparatuses capable of converting an expanding fluid to a power output. The method 800 concludes at 808.

Figure 9:
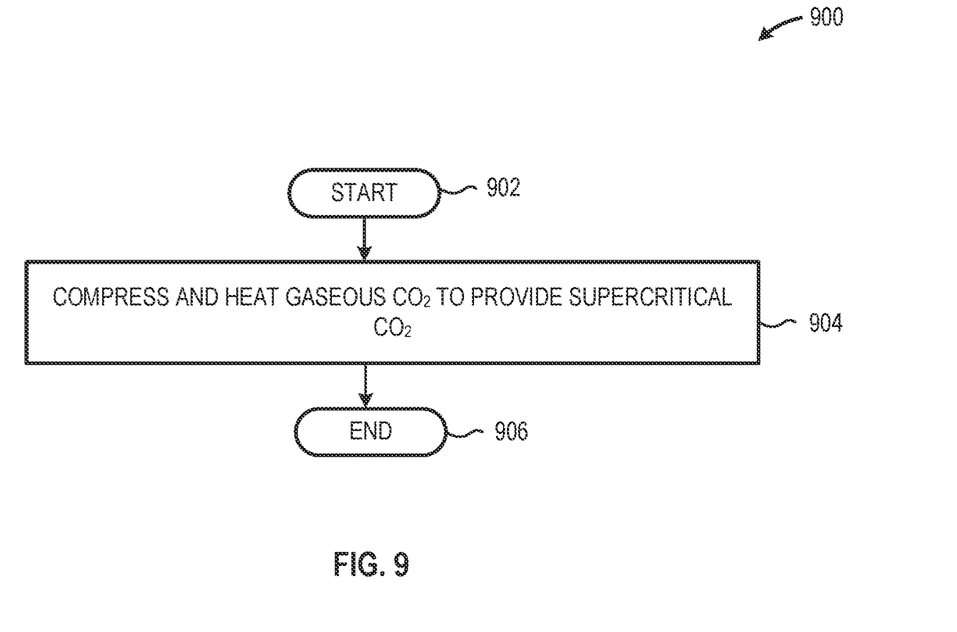
FIG. 9 is a high-level flow diagram of an illustrative supercritical $CO_2$ power generation method, in accordance with at least one embodiment described herein.

FIG. 9 is a high-level flow diagram of an illustrative supercritical $CO_2$ power generation method 900, in accordance with at least one embodiment described herein. The method 900 may be used in conjunction with the method 800 described above with respect to FIG. 8. The method 900 includes a $CO_2$ compressor system 140 that receives gaseous $CO_2$ at the fourth temperature 158 and the fourth pressure 168 from the second $CO_2$ expansion system 130 and returns supercritical $CO_2$ at the first temperature 152 and the first pressure 162 to the first $CO_2$ expansion system 110. In some embodiments, the $CO_2$ compressor system 140 may receive a power input 142. In some embodiments, the power input 142 to the $CO_2$ compressor system 140 may be provided, at least in part, using the first power output 112 from the first $CO_2$ expansion system 110 and/or the second power output 132 from the second $CO_2$ expansion system 130. The method 900 commences at 902.

At 904, the $CO_2$ compressor system 140 receives gaseous $CO_2$ at the fourth temperature 158 and the fourth pressure 168 from the second $CO_2$ expansion system 110. The $CO_2$ compressor system 140 discharges a supercritical $CO_2$ at the first temperature 152 and the first pressure 162. At least a portion of the supercritical $CO_2$ may be returned to the first $CO_2$ expansion system 110. In embodiments, the $CO_2$ compressor system 140 may include one or more heat exchangers, coolers, chillers, condensers, or similar thermal transfer devices and/or systems used to provide supercritical $CO_2$ at the first temperature 152 to the first $CO_2$ expansion system 110. In embodiments, the $CO_2$ compressor system 140 may include one or more compressors, pumps, or similar pressure increasing devices and/or systems. The method 900 concludes at 904.

Figure 10:
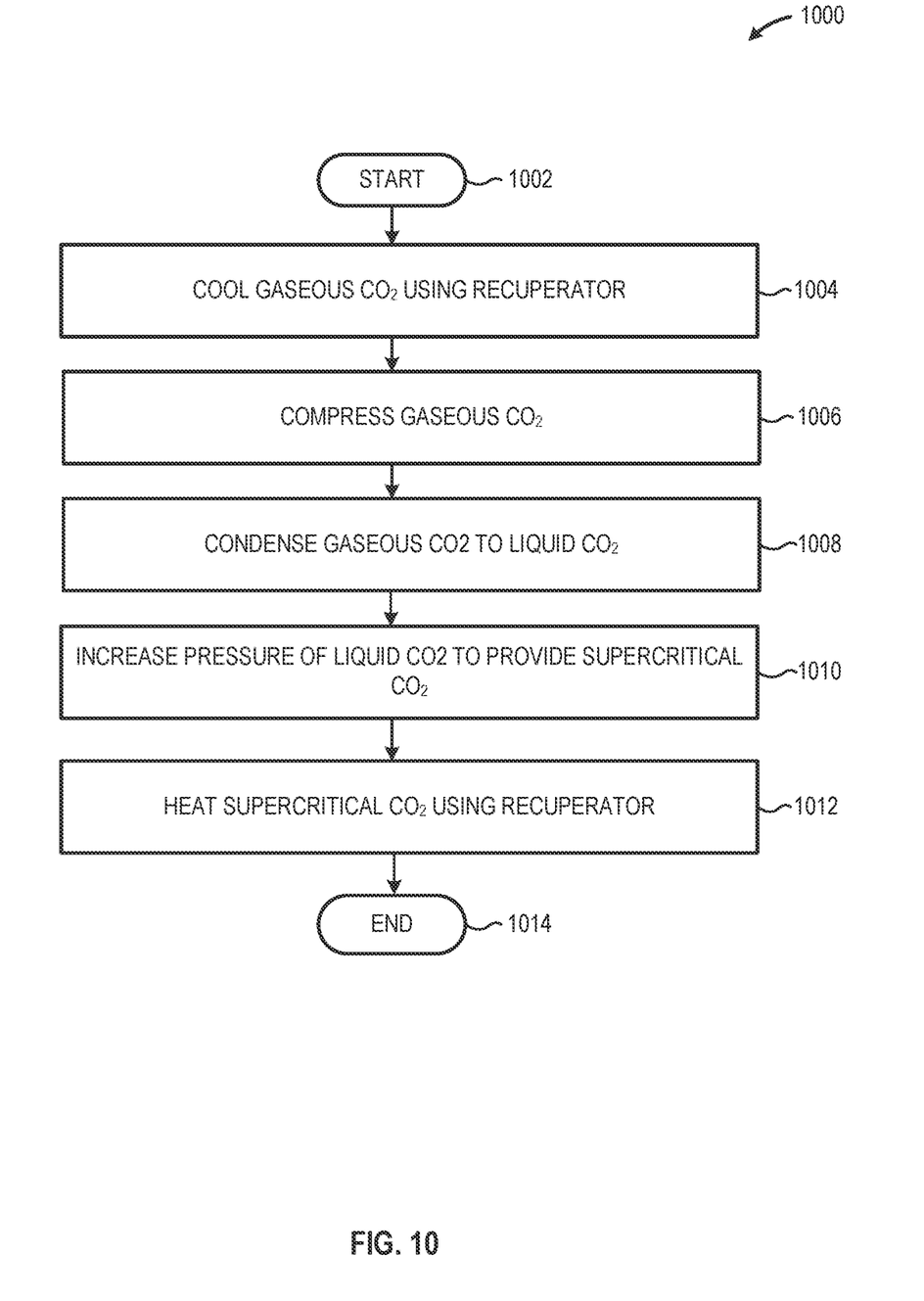
FIG. 10 is a high-level flow diagram of an illustrative supercritical $CO_2$ power generation method, in accordance with at least one embodiment described herein.

FIG. 10 is a high-level flow diagram of an illustrative supercritical $CO_2$ power generation method 1000, in accordance with at least one embodiment described herein. The method 1000 may be used in conjunction with the method 800 described above with respect to FIG. 8. The method 900 may include some or all of method 1000. The method 1000 includes a recuperator 210 to cool the gaseous $CO_2$ received from the second $CO_2$ expansion system 130; a compressor to compress the gaseous $CO_2$; a condenser to liquefy the gaseous $CO_2$; and a fluid mover 240 to increase the pressure of the liquefied $CO_2$ to a pressure greater than the critical pressure of $CO_2$. The liquefied $CO_2$ may be heated to a temperature greater than the critical temperature of $CO_2$ using the recuperator 210. In some embodiments, the power input 142 to the compressor 220 may be provided, at least in part, using the first power output 112 from the first $CO_2$ expansion system 110 and/or the second power output 132 from the second $CO_2$ expansion system 130. The method 1000 commences at 1002.

At 1004, the recuperator 210 receives gaseous $CO_2$ at the fourth temperature 158 and the fourth pressure 168 from the second $CO_2$ expansion system 110. The recuperator 210 cools the gaseous $CO_2$ to the fifth temperature 252. The cooled $CO_2$ exiting the recuperator 210 is at the fifth pressure 262. In some implementations, the recuperator 210 may cool the relatively high temperature gaseous $CO_2$ using a relatively low temperature liquefied $CO_2$.

At 1006, the compressor 220 receives the cooled, gaseous, $CO_2$ at the fifth temperature 252 and the fifth pressure 262 from the recuperator 210. The compressor 220 compresses and heats the gaseous $CO_2$, discharging the compressed gaseous $CO_2$ at the sixth temperature 254 and the sixth pressure 264. In some implementations, the compressor 220 may receive a power input 142. In some implementations, at least a portion of the power input 142 may be provided by the first $CO_2$ expansion system power output 112 and/or the second $CO_2$ expansion system power output 132. In some implementations, the compressor 220 may include one or more single- or multi-state supersonic (e.g., Dresser/Ramgen Power System) compressors.

At 1008, the condenser 230 receives, from the compressor 220, the compressed, gaseous, $CO_2$ at the sixth temperature 254 and the sixth pressure 264. The condenser 230 reduces the temperature of the compressed, gaseous, $CO_2$ sufficient to condense and liquefy all or a portion of the gaseous $CO_2$. The liquefied $CO_2$ exits the condenser at the seventh temperature 256 and the seventh pressure 266.

At 1010, the fluid mover 240 receives, from the condenser 230, the liquefied $CO_2$ at the seventh temperature 256 and the seventh pressure 266. The fluid mover 240 increases the liquefied $CO_2$ to an eighth pressure 268 at or above the critical pressure of $CO_2$ (i.e., 1071 psia). The relatively high pressure $CO_2$ exits the fluid mover 240 at the eighth temperature 258 and the eighth pressure 268.

At 1012, the recuperator 210 receives, from the fluid mover 240, the relatively high-pressure, relatively low-temperature liquefied $CO_2$. The relatively low-temperature liquefied $CO_2$ provides a cooling media for the relatively high-temperature gaseous $CO_2$ entering the recuperator 210 from the second $CO_2$ expansion system 130. The method 1000 concludes at 1014.

While FIGS. 8 through 10 illustrate various operations according to one or more embodiments, it is to be understood that not all of the operations depicted in FIGS. 8 through 10 are necessary for other embodiments. Indeed, it is fully contemplated herein that in other embodiments of the present disclosure, the operations depicted in FIGS. 8 through 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Thus, the present disclosure is directed to systems and methods generating power using supercritical $CO_2$ in a Brayton cycle that incorporates a first $CO_2$ expansion system positioned upstream of the heater such that the supercritical $CO_2$ provided to the heater is at a relatively low pressure as compared to the relatively high pressure supercritical $CO_2$ provided to the first $CO_2$ expansion system. Reducing the operating pressure of the heater beneficially and advantageously permits the use of lower cost materials of construction in the heater. For direct-fired oxy-combustion cycles, operating the heater at an intermediate expansion pressure simplifies the feed of solid fuels such as coal or biomass into the reactor. At pressures below approximately 1300 psia, posimetric pumps may be used to dry feed fuel to the heater, minimizing the impact of a slurry fluid on system performance. For indirect-fired cycles, operating the heat exchanger at an intermediate expansion pressure simplifies the heat exchanger design, opening the design space to lower grade or more readily available materials than those used in high-pressure indirect-fired systems. For transcritical cycles, selection of an intermediate expansion pressure just above the critical pressure simplifies the turbine design suitable for accommodating a high pressure ratio with phase change into two lower pressure ratio, single phase components (a supercritical turbine and a vapor phase turbine).

The systems and methods described herein reduce relatively high pressure supercritical $CO_2$ to a relatively low-pressure supercritical $CO_2$ using a first $CO_2$ expansion system positioned upstream of the thermal input system. The relatively low-pressure supercritical $CO_2$ passes through the thermal input system and into a second $CO_2$ expansion system. The first supercritical $CO_2$ expansion system provides a first power output and/or the second $CO_2$ expansion system provides a second power output. A $CO_2$ compressor system converts the gaseous $CO_2$ exiting the second $CO_2$ expansion system to the relatively high-pressure supercritical $CO_2$, at least a portion of which is returned to the first $CO_2$ expansion system.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for generating a shaft work output using a double-wall expansion system that includes an inner chamber and an outer chamber separated by an inner chamber wall. The relatively thin inner chamber wall may be fabricated using a high-temperature alloy material. The relatively thick outer chamber wall may be fabricated using a lower temperature alloy material.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A carbon dioxide ($CO_2$) power system, comprising:
a first $CO_2$ expansion system having an inlet and an outlet, the first $CO_2$ expansion system configured to:
receive, via the first $CO_2$ expansion system inlet, $CO_2$ at a first temperature and a first pressure; and
expand at least a portion of the $CO_2$ to provide a first power output; and
discharge, via the first $CO_2$ expansion system outlet, at least a portion of the $CO_2$ at a second temperature and an intermediate second pressure, the second temperature lower than the first temperature and the second pressure lower than the first pressure;
a heater having an inlet and an outlet, wherein the heater inlet fluidly couples to the first $CO_2$ expansion system outlet, the heater to:
receive, via the heater inlet, at least a portion of the $CO_2$ at the second temperature and the second pressure; and
discharge, via the heater outlet, at least a portion of the $CO_2$ at a third temperature and a third pressure, the third temperature greater than the second temperature;
a second $CO_2$ expansion system having an inlet and an outlet, wherein the second $CO_2$ expansion system inlet fluidly couples to the heater outlet, the second $CO_2$ expansion system configured to:
receive, via the second $CO_2$ expansion system inlet, at least a portion of the $CO_2$ at the third temperature and the third pressure;
expand the $CO_2$ to provide a second power output; and
discharge, via the second $CO_2$ expansion system discharge, at least a portion of the $CO_2$ at a fourth temperature and a fourth pressure, the fourth temperature lower than the third temperature and the fourth pressure lower than the third pressure, wherein the first $CO_2$ expansion system comprises at least one first $CO_2$ turbine system, that in operation, provide the first power output;

the second $CO_2$ expansion system comprises at least one second turbine system that in operation, provide the second power output;

the $CO_2$ at the first temperature and the first pressure comprises supercritical $CO_2$;

the $CO_2$ at the second temperature and the second pressure comprises supercritical $CO_2$;

the $CO_2$ at the third temperature and the third pressure comprises supercritical $CO_2$; and the $CO_2$ at the fourth temperature and the fourth pressure comprises a gaseous $CO_2$.

2. The $CO_2$ power system of claim 1, further comprising:
a $CO_2$ compressor system having an inlet and an outlet, the $CO_2$ compressor system inlet to fluidly couple to the second $CO_2$ expansion system outlet, the $CO_2$ compressor system outlet to fluidly couple to the first $CO_2$ expansion system inlet, the $CO_2$ compressor system to receive a shaft input, and the $CO_2$ compressor system to:
receive, via the $CO_2$ compressor system inlet, at least a portion of the $CO_2$ at the fourth temperature and the fourth pressure; and
discharge, via the $CO_2$ compressor system outlet, at least a portion of the $CO_2$ at the first temperature and the first pressure, the first temperature less than the fourth temperature and the first pressure greater than the fourth pressure.

3. The $CO_2$ power system of claim 2 wherein at least one of: the first power output or the second power output provides at least a portion of the power input to the $CO_2$ compressor system.

4. The $CO_2$ power system of claim 1, further comprising:
a recuperator having an inlet, an outlet, a coolant inlet and a coolant outlet, the recuperator inlet to fluidly couple to the second $CO_2$ expansion system outlet, the recuperator to:
receive, via the recuperator inlet, at least a portion of the $CO_2$ at the fourth temperature and the fourth pressure;
discharge, via the recuperator outlet, at least a portion of the $CO_2$ at a fifth temperature and a fifth pressure; the fifth temperature less than the fourth temperature;
at least one compressor having an inlet and an outlet, the compressor to receive a first shaft input; the compressor inlet to fluidly couple to the heat exchanger outlet, the at least one compressor to:
receive, via the compressor inlet, at least a portion of the $CO_2$ from the fifth temperature and the fifth pressure; and
discharge, via the compressor outlet, the $CO_2$ at a sixth temperature and a sixth pressure, the sixth temperature greater than the fifth temperature and the sixth pressure greater than the fifth pressure;
a condenser having an inlet and an outlet, the condenser to fluidly couple to the compressor outlet, the condenser to:
receive, via the condenser inlet, at least a portion of the $CO_2$ at the sixth temperature and the sixth pressure; and
discharge, via the condenser outlet, the $CO_2$ at a seventh temperature and a seventh pressure; the seventh temperature less than the sixth temperature;
a fluid mover having an inlet and an outlet, the fluid mover inlet to fluidly couple to the condenser outlet and the fluid mover outlet to fluidly couple to the heat exchanger coolant inlet, the fluid mover to:
receive, via the fluid mover inlet, at least a portion of the $CO_2$ at the seventh temperature and the seventh pressure; and
discharge, via the fluid mover outlet, the $CO_2$ at a eighth temperature and a eighth pressure, the eighth pressure greater than the seventh pressure.

5. The $CO_2$ power system of claim 4 further comprising a second recuperator having an inlet, outlet, coolant inlet, and coolant outlet, the second recuperator inlet to fluidly couple to the compressor outlet to receive at least a portion of the $CO_2$ at the sixth temperature and the sixth pressure, the second recuperator outlet to fluidly couple to the condenser inlet, the second recuperator coolant inlet to fluidly couple to the fluid mover outlet to receive the $CO_2$ at the eighth temperature and the eighth pressure, the eighth pressure and the second recuperator coolant outlet to fluidly couple to the recuperator coolant inlet.

6. The $CO_2$ power system of claim 4 further comprising a chiller having an inlet and an outlet, the chiller inlet to fluidly couple to the recuperator outlet to receive at least a portion of the $CO_2$ at the fifth temperature and the fifth pressure from the recuperator; and the chiller outlet to fluidly couple to the compressor inlet.

7. The $CO_2$ power system of claim 4 wherein the $CO_2$ at the fifth temperature and the fifth temperature comprises a gaseous $CO_2$.

8. The $CO_2$ power system of claim 7 wherein the $CO_2$ at the sixth temperature and the sixth temperature comprises a gaseous $CO_2$.

9. The $CO_2$ power system of claim 8 wherein the $CO_2$ at the seventh temperature and the seventh temperature comprises a liquid $CO_2$.

10. The $CO_2$ power system of claim 9 wherein the $CO_2$ at the eighth temperature and the eighth pressure comprises a supercritical $CO_2$.

* * * * *